United States Patent
Deng et al.

(10) Patent No.: US 9,994,184 B2
(45) Date of Patent: Jun. 12, 2018

(54) VEHICLE SIDE AIRBAG WITH SECONDARY CHAMBER

(71) Applicant: Ford Global Technologies, LLC, Dearborn, MI (US)

(72) Inventors: Zhibing Deng, Northville, MI (US); Luis Enrique Castillo jaime, Mexico (MX); Srinivas Reddy Malapati, Novi, MI (US); Nial James Wykes, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 34 days.

(21) Appl. No.: 14/675,348

(22) Filed: Mar. 31, 2015

(65) Prior Publication Data
US 2016/0288762 A1  Oct. 6, 2016

(51) Int. Cl.
| | |
|---|---|
| *B60R 21/232* | (2011.01) |
| *B60R 21/0136* | (2006.01) |
| *B60R 21/2342* | (2011.01) |
| *G05B 15/02* | (2006.01) |
| *B60R 21/01* | (2006.01) |
| *B60R 21/00* | (2006.01) |
| *B60R 21/231* | (2011.01) |

(52) U.S. Cl.
CPC ........ *B60R 21/232* (2013.01); *B60R 21/0136* (2013.01); *B60R 21/2342* (2013.01); *B60R 2021/0009* (2013.01); *B60R 2021/01211* (2013.01); *B60R 2021/01225* (2013.01); *B60R 2021/23107* (2013.01); *G05B 15/02* (2013.01)

(58) Field of Classification Search
CPC . B60R 21/233; B60R 21/0136; B60R 21/232; B60R 21/2342; B60R 21/01; B60R 2021/01211; B60R 2021/23316; B60R 2021/01109; B60R 2021/23308; B60R 2021/01286; B60R 2021/0009; B60R 2021/23107; B60R 2021/01225; G05B 15/02

See application file for complete search history.

(56) References Cited

U.S. PATENT DOCUMENTS

| | | | | |
|---|---|---|---|---|
| 5,202,831 | A * | 4/1993 | Blackburn | B60N 2/0276 180/282 |
| 6,065,772 | A * | 5/2000 | Yamamoto | B60R 21/207 280/730.2 |
| 6,073,960 | A * | 6/2000 | Viano | B60R 21/231 280/730.1 |

(Continued)

FOREIGN PATENT DOCUMENTS

| | | |
|---|---|---|
| CN | 203543883 U | 4/2014 |
| KR | 20140072525 | 6/2014 |

(Continued)

*Primary Examiner* — Paul N Dickson
*Assistant Examiner* — Timothy Wilhelm
(74) *Attorney, Agent, or Firm* — Frank A. MacKenzie; Bejin Bieneman PLC

(57) ABSTRACT

A side curtain airbag that has a rear chamber, a front chamber and a secondary chamber affixed to said front chamber. The side curtain air bag has tear stitching and permanent stitching connecting the secondary chamber to an inboard panel of the air curtain such that, in a deployed state, the secondary chamber occupies a gap between a driver airbag and the curtain airbag.

20 Claims, 7 Drawing Sheets

(56) References Cited

U.S. PATENT DOCUMENTS

| | | | |
|---|---|---|---|
| 6,196,575 B1* | 3/2001 | Ellerbrok | B60R 21/233 280/729 |
| 6,851,706 B2* | 2/2005 | Roberts | B60R 21/23138 280/730.1 |
| 7,138,938 B1* | 11/2006 | Prakah-Asante | B60R 21/0134 342/175 |
| 7,236,865 B2* | 6/2007 | Prakah-Asante | B60R 21/0134 180/271 |
| 7,278,655 B2* | 10/2007 | Inoue | B60R 21/2342 280/730.2 |
| 7,549,672 B2* | 6/2009 | Sato | B60R 21/207 280/729 |
| 7,712,768 B2* | 5/2010 | Fukuda | B60R 21/232 280/729 |
| 7,784,823 B2* | 8/2010 | Heigl | B60R 21/213 280/730.2 |
| 7,988,187 B2* | 8/2011 | Yamamura | B60R 21/232 280/730.2 |
| 8,282,124 B2* | 10/2012 | Trovato | B60R 21/232 280/730.2 |
| 8,463,500 B2* | 6/2013 | Cuddihy | B60R 21/0132 280/735 |
| 8,608,193 B1* | 12/2013 | Wysocki | B60R 21/233 280/730.2 |
| 8,622,420 B2* | 1/2014 | Kato | B60R 21/0136 280/730.2 |
| 8,636,301 B1* | 1/2014 | Wang | B60R 21/232 280/730.2 |
| 8,814,202 B2 | 8/2014 | Matsushita et al. | |
| 8,851,508 B1* | 10/2014 | Rickenbach | B60R 21/232 280/729 |
| 8,876,153 B2* | 11/2014 | Dix | B60R 21/233 280/729 |
| 8,894,094 B2* | 11/2014 | Wang | B60R 21/232 280/730.2 |
| 8,899,617 B2* | 12/2014 | Fukawatase | B60R 21/232 280/730.2 |
| 8,903,611 B2* | 12/2014 | Uchida | B60R 21/0136 280/735 |
| 8,967,660 B2* | 3/2015 | Taguchi | B60R 21/233 280/729 |
| 9,067,563 B2* | 6/2015 | Okuhara | B60R 21/2338 |
| 9,108,588 B2* | 8/2015 | Fukawatase | B60R 21/233 |
| 9,110,169 B2* | 8/2015 | Stettner | B60R 21/0134 |
| 9,114,777 B2* | 8/2015 | Fukawatase | B60R 21/232 |
| 9,156,427 B2* | 10/2015 | Wang | B60R 21/232 |
| 9,254,803 B2* | 2/2016 | Park | B60R 21/0132 |
| 9,266,494 B2* | 2/2016 | Wang | B60R 21/237 |
| 9,296,360 B2* | 3/2016 | Komamura | B60R 21/276 |
| 9,327,669 B2* | 5/2016 | Jaradi | B60R 21/08 |
| 9,340,176 B2* | 5/2016 | Belwafa | B60R 21/233 |
| 9,469,269 B2* | 10/2016 | Hiruta | B60R 21/232 |
| 9,580,039 B2* | 2/2017 | Schneider | B60R 21/233 |
| 2002/0180190 A1* | 12/2002 | Tobe | B60R 21/232 280/730.2 |
| 2011/0022275 A1* | 1/2011 | Oosaki | B60R 21/0136 701/45 |
| 2013/0270805 A1* | 10/2013 | Kruse | B60R 21/232 280/730.2 |
| 2014/0042732 A1* | 2/2014 | Taguchi | B60R 21/233 280/729 |
| 2014/0203541 A1* | 7/2014 | Wei | B60R 21/213 280/730.2 |
| 2015/0084316 A1* | 3/2015 | Okuhara | B60R 21/2338 280/729 |
| 2015/0166002 A1* | 6/2015 | Fukawatase | B60R 21/233 280/730.1 |
| 2015/0266439 A1* | 9/2015 | Foo | B60R 21/0132 701/45 |
| 2015/0274108 A1* | 10/2015 | Iguchi | B60R 21/0132 280/729 |
| 2015/0274116 A1* | 10/2015 | Jaradi | B60R 21/0136 701/45 |
| 2015/0307057 A1* | 10/2015 | Moon | B60R 21/232 280/728.2 |
| 2015/0375704 A1* | 12/2015 | Jaradi | B60R 21/08 280/749 |

FOREIGN PATENT DOCUMENTS

| | | | |
|---|---|---|---|
| WO | WO 2012-111073 | * | 8/2012 |
| WO | WO 2012111073 | | 8/2012 |

* cited by examiner

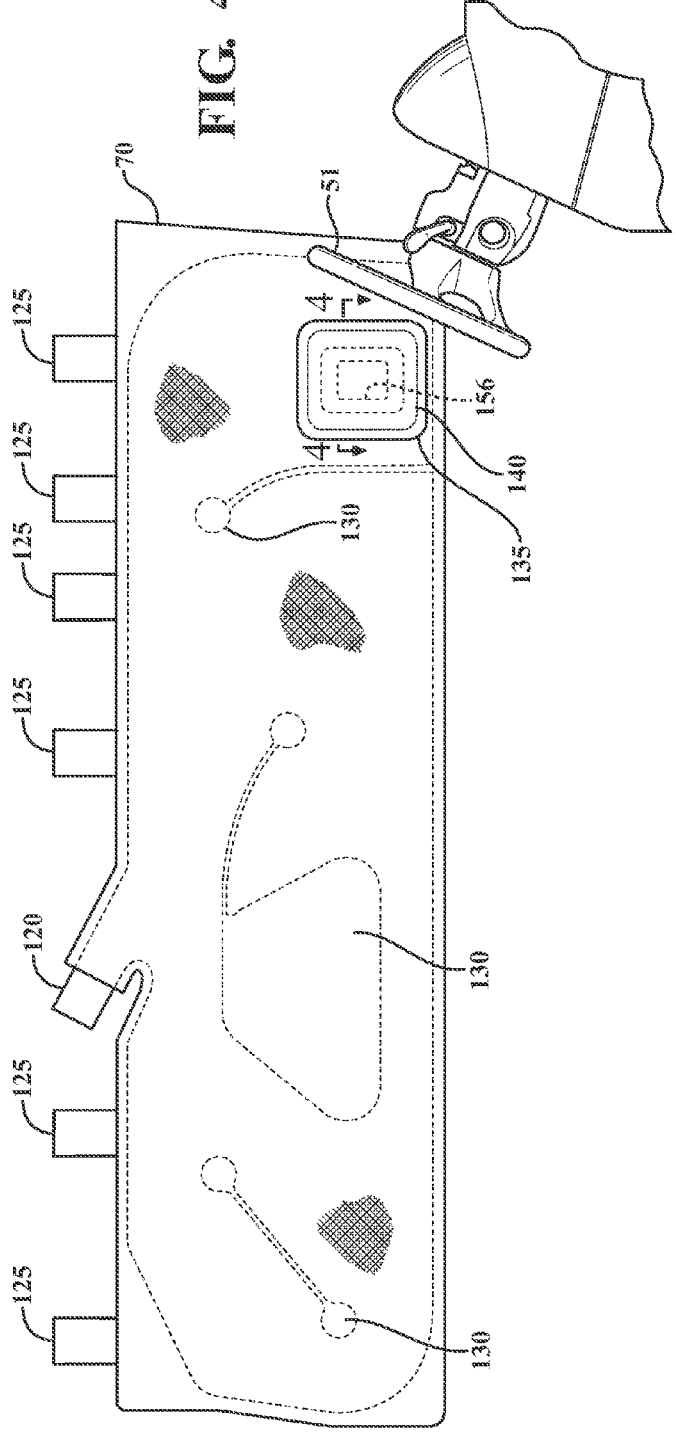
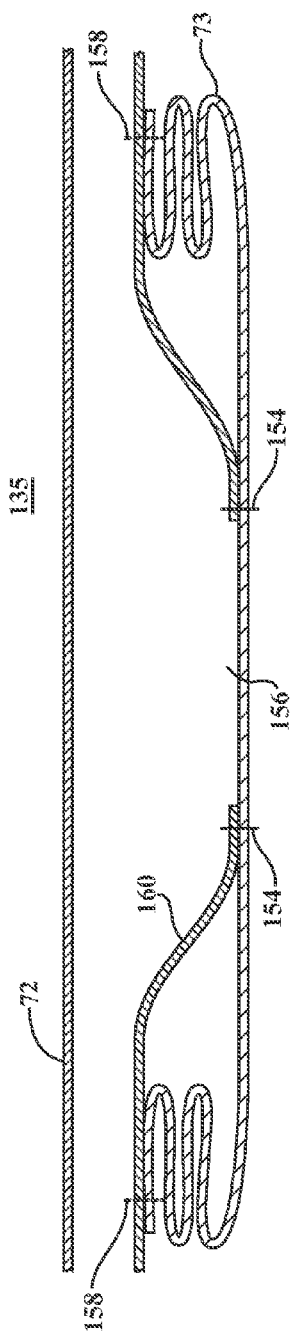

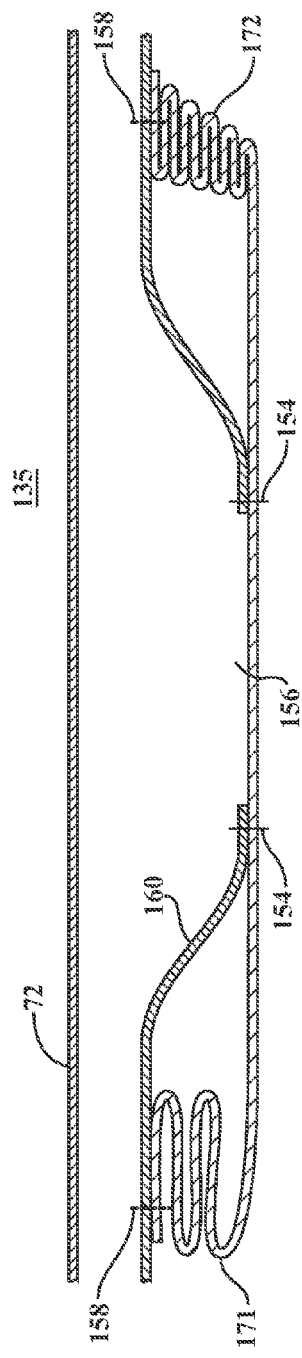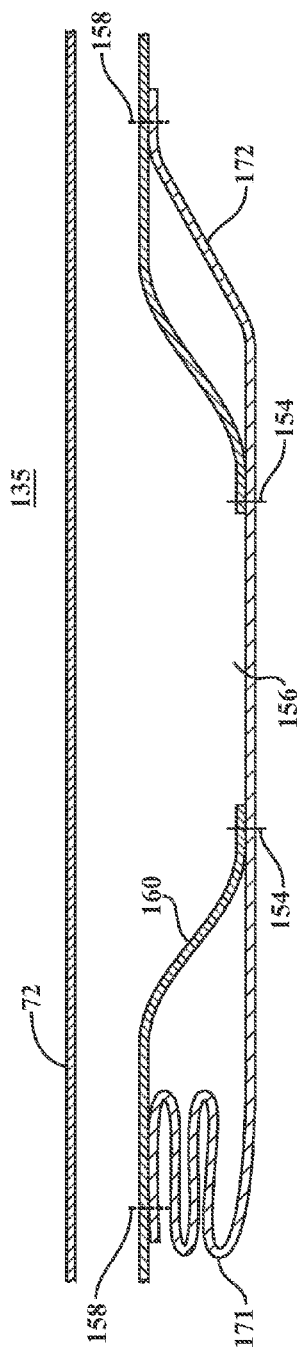

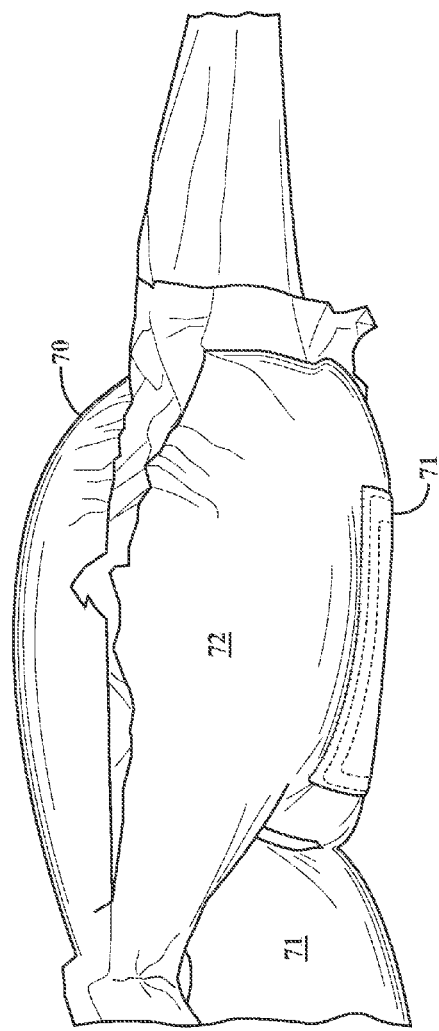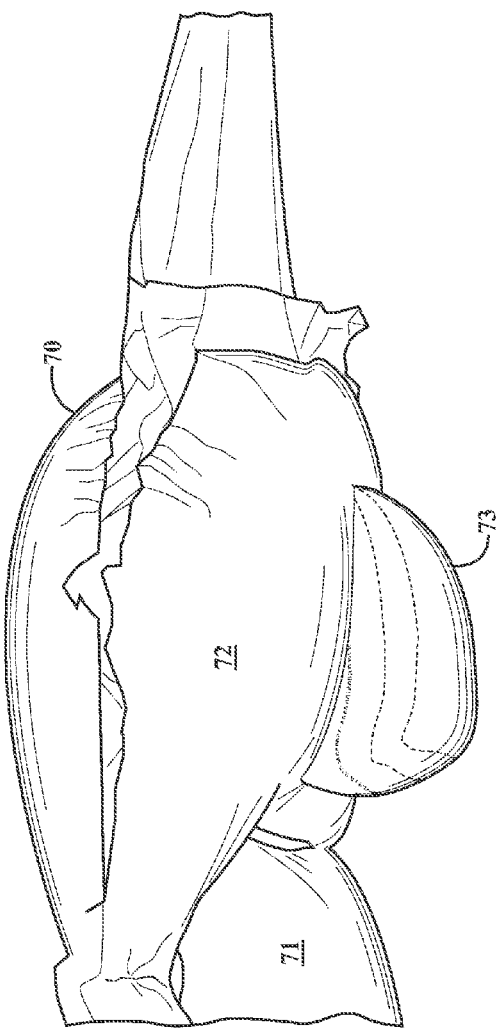

VEHICLE SIDE AIRBAG WITH SECONDARY CHAMBER

BACKGROUND

Vehicles, such as automobiles, may include equipment for protecting passengers from the impact of collisions, for example, safety belts, airbags and energy absorption mechanisms. It can be desired to control equipment such as airbags to adjust to certain collision conditions, such as collision forces on a vehicle which cause movement of passengers within the vehicle.

A frontal impact is an impact that occurs when two vehicles strike each other approximately head on. An oblique impact occurs when a vehicle frontally strikes an object such as another vehicle at an angle of fifteen to thirty degrees with respect to a longitudinal axis of the vehicle. Today's vehicles are generally good at protecting occupants in a frontal offset impacts. However, in an oblique impacts, and even in some frontal impacts, augmented ejection mitigation and side impact protection is desirable.

BRIEF DESCRIPTION OF THE DRAWINGS

FIG. 4 is a perspective view of the secondary chamber.

FIG. 5A is a sectional view of the secondary chamber with symmetrically folded chambers.

FIG. 5B is a sectional view of the secondary chamber with asymmetrically folded chambers.

FIG. 5C is a sectional view of the secondary chamber with only one folded chamber.

FIG. 6 is a top view of a vehicle side curtain airbag without a secondary chamber in a undeployed state.

FIG. 7 is top view of a vehicle side curtain airbag and the secondary chamber in a deployed state.

DETAILED DESCRIPTION

The disclosed subject matter is described in an illustrative manner, and it is to be understood that the terminology which has been used is intended to be in the nature of words of description rather than of limitation. Many modifications and variations of the present disclosure are possible in light of the following teachings, and the disclosure may be practiced otherwise than as specifically described.

Figure 1:
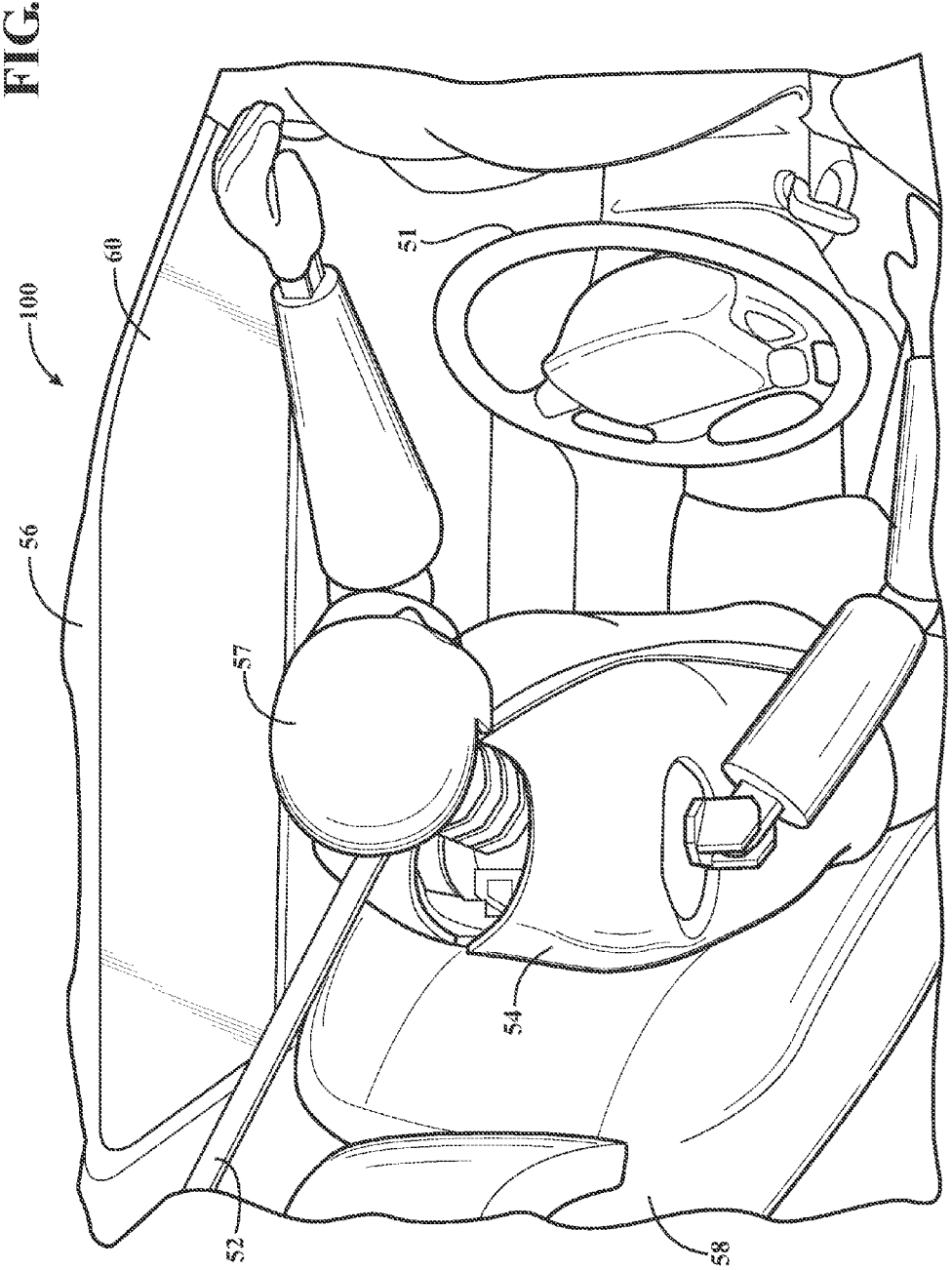
FIG. 1 is a perspective view of an example of a passenger protection system in an undeployed state.

With reference to the Figures, wherein like numerals indicate like parts throughout the several views, FIG. 1 shows an example of a passenger protection system 100 in an undeployed state. For illustrative purposes, an occupant 54 is shown in front of a steering wheel 51 with a driver-side air bag (DAB) 50 (see FIG. 2) installed therein.

The occupant 54 is strapped to a vehicle seat 58 by a seatbelt assembly 52 and is thereby positioned in the seat 58. A vehicle frame 56 and a glass window 60 are also illustrated for context.

Figure 2:
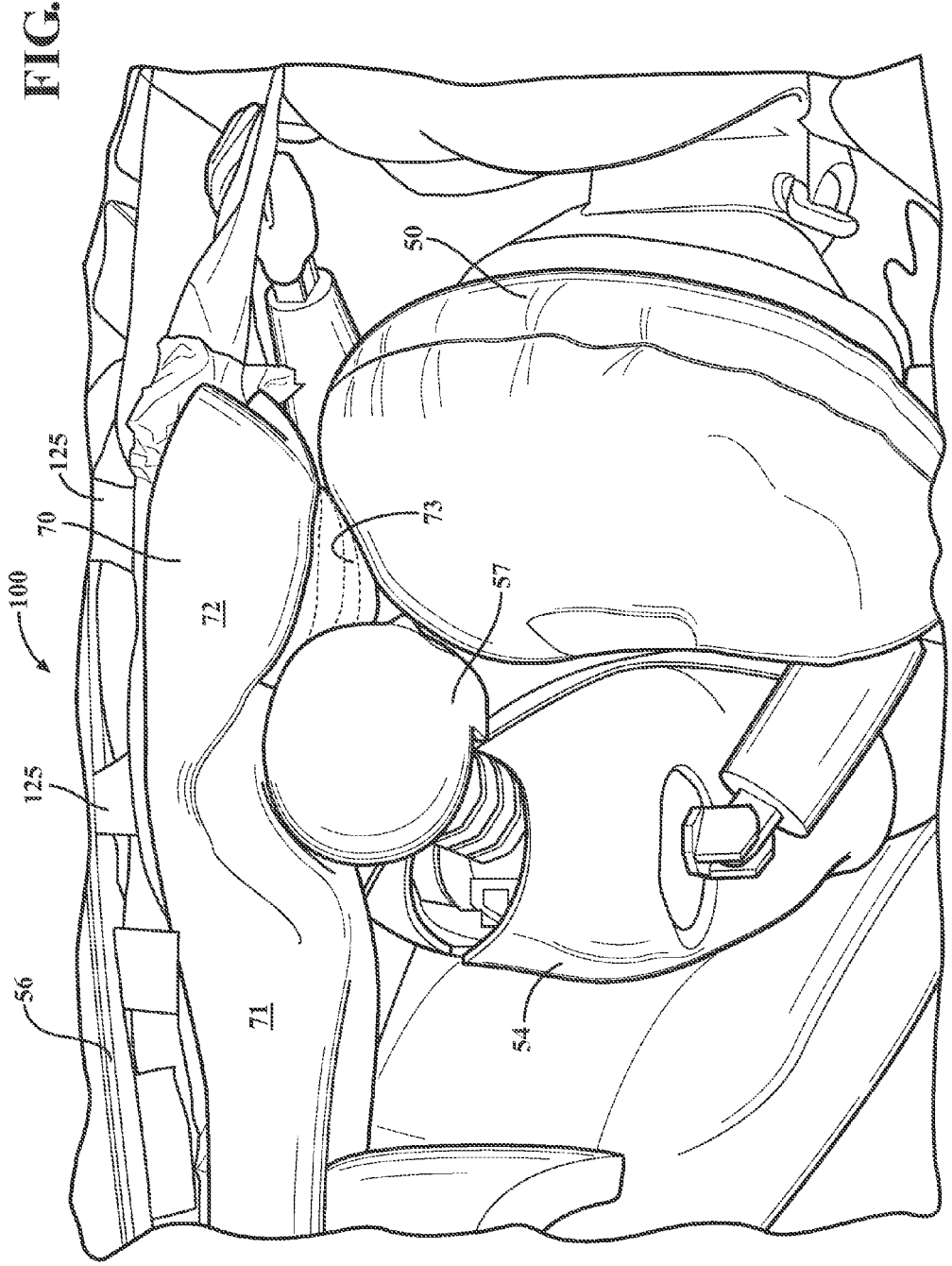
FIG. 2 is a perspective view of the passenger protection system of FIG. 1 in a deployed state.
Figure 3:
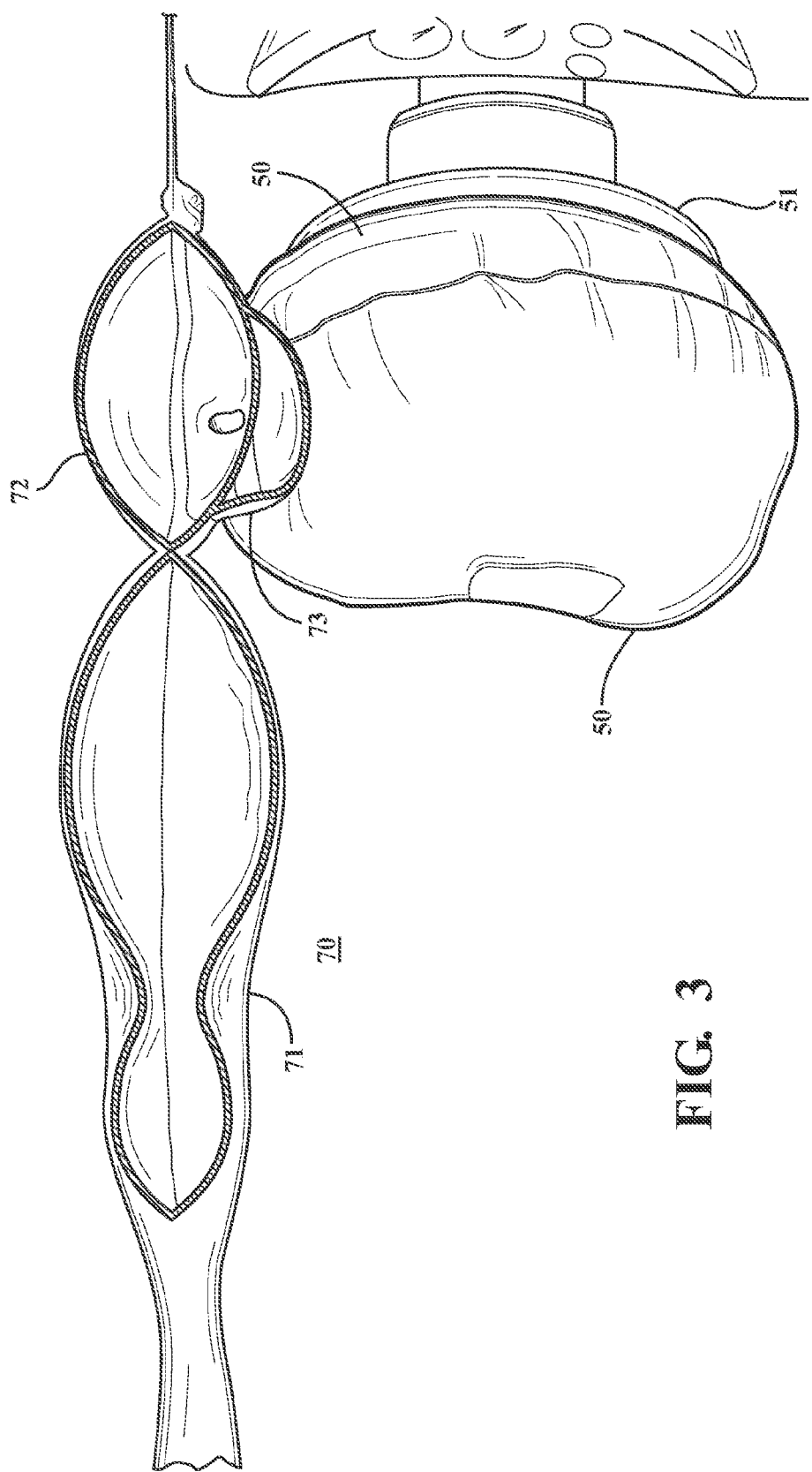
FIG. 3 is a sectional view of a secondary chamber deployed adjacent to the steering wheel and a deployed driver air bag.

During an oblique impact, e.g., the vehicle frontally striking an object such as another vehicle at an angle of fifteen to thirty degrees with respect to a longitudinal axis of the vehicle, a controller 22 included in an impact sensing sub-system 20 (see FIG. 8) of the system 100 activates a triggering mechanism 11, which causes the passenger protection system 100 to deploy as shown in FIG. 2. Further, referring now to FIGS. 2-3, in addition to the driver airbag 50, the system 100 includes a side airbag 70 with a rear chamber 71, a front chamber 72 and a secondary side chamber 73 attached to a side of the front chamber 72. The secondary side chamber 73 is utilized to provide additional cushioning and energy absorption for the head 57 of an occupant 54 upon motion of the occupant 54, including his or her head 54 during an oblique crash by helping to prevent the occupant's head 57 from sliding off the DAB 50. Additionally and advantageously, the secondary side chamber 73 and/or the DAB 50 provide reaction surfaces that provide extra cushioning. The deployed secondary chamber 73, which may be wedge-shaped, fills a gap that would otherwise exist between the DAB 50 and the curtain airbag 70. The shape of the secondary side chamber 73 in this example is that of a wedge, but other shapes may be used, for example, rectangle, oval, pear, hourglass or bullet nose; in any case, the chamber 73 should fill the gaps between the DAB 50 and the airbag curtain 70.

As best illustrated in FIG. 4, the curtain airbag 70, including its chambers 71, 72 and 73, is mounted to a rigid surface such as a side frame portion 56 of a vehicle via mounting assemblies 125. Mounting assemblies 125 are generally conventional components known for attaching a side airbag 70 or the like to a vehicle frame 56. An inflator gas inlet 120 is utilized to inflate the curtain airbag 70 chambers at the time of deployment. The curtain airbag 70 additionally has optimally located squelch pad(s) 130 or dead spots, such as are known, positioned on the chambers 71, 72 to hasten their inflation in a predetermined manner. The pads 130 are positioned on the curtain airbag 70 in areas of the curtain that do not need to be filled or that can function with partial inflation, for example, the pads 130 can be adjacent to fixed physical items 130, such as a car seat or headrest, which do not need extra protection.

FIG. 5A illustrates the undeployed storage of the secondary chamber 73 in a storage pocket 135 included in the curtain airbag 70 front chamber 72. The secondary chamber 73 is permanently affixed to an inboard panel 160 of the front chamber 72 by stitching 158, while tear-stitching 154 also attaches the undeployed secondary chamber 73 to the front chamber 72 inboard panel 160. Upon deployment, the secondary chamber 73 is filled with gas from the front chamber 72 via a baffle vent 156, such as is known. As the secondary chamber 73 inflates, the tear stitching 154 breaks and the secondary chamber 73 inflates and is positioned between the DAB 50 and the curtain 70.

It should be noted that the undeployed folding pattern or pleating of the secondary chamber 73 will vary with the shape of the secondary chamber 73, i.e., a left section 171 folding pattern and a right section 172 folding pattern may not be symmetric as shown in FIG. 5B. In an alternative embodiment, a section of the undeployed secondary chamber 73 may not contain any folding or pleating as shown in FIG. 5C. The left section 171 is folded and the right section 172 is not.

The stitching 158 is a permanent stitching and can be replaced by some other mechanism for adhering the secondary chamber 73 to the front chamber 72, for example, glue, chemical welding, staples, or some other such mechanism. In another embodiment, the secondary chamber 73 and the air curtain 70 can be formed together at the same time via an injection molding system or any other airbag manufacturing process, e.g., as are known.

The size, shape and positioning of the baffle vent 156 connecting the secondary chamber 73 to the curtain airbag 70, e.g., to the front panel 72, are examples of parameters that may be varied according to a vehicle type, size, interior configuration, etc. In general, parameters may be used to optimize deployment of the secondary chamber 73. For example, it is possible to specify dimensions of the baffle vent 156 to suit a particular vehicle size and type. Additionally, the size, shape and positioning of the secondary chamber 73 itself are also important to ensure that gaps, i.e., physical space, between the DAB 50 and curtain airbag 70 are minimal or non-existent. As discussed above, a useful shape for the secondary chamber 73 is wedge. Referring back to FIG. 2 seen therein is a deployed secondary chamber 73, having a wedge shape and filling a gap between the DAB 50 and the air curtain 70.

In an embodiment, a controller 22 (see FIG. 8) included in the system 100 will execute programming to determine if the secondary chamber 73 should be deployed, i.e., the severity of a crash does not exceed a predetermined threshold which is stored in memory 26 of a controller 22. thus, the system may not inflate the secondary chamber 73 upon every incidence of deploying and inflating the airbag 70. FIG. 6 is a perspective illustration showing the placement of an undeployed secondary chamber 73 on the air curtain 70. Alternatively, the system 100 may determine to inflate the secondary chamber 73 along with the curtain airbag 70. FIG. 7 is another perspective illustration showing the placement of an deployed secondary chamber 73 on the air curtain 70.

Alternatively or additionally, another way to adjust parameters of the system 100 to a particular vehicle type is to vary tensile strengths of tear stitching 154 according to a force for a particular vehicle type desired to cause the stitching 154 to tear, and/or or to use different patterns in tear stitching 154 when attaching the secondary chamber 73 into the side panel.

Figure 8:
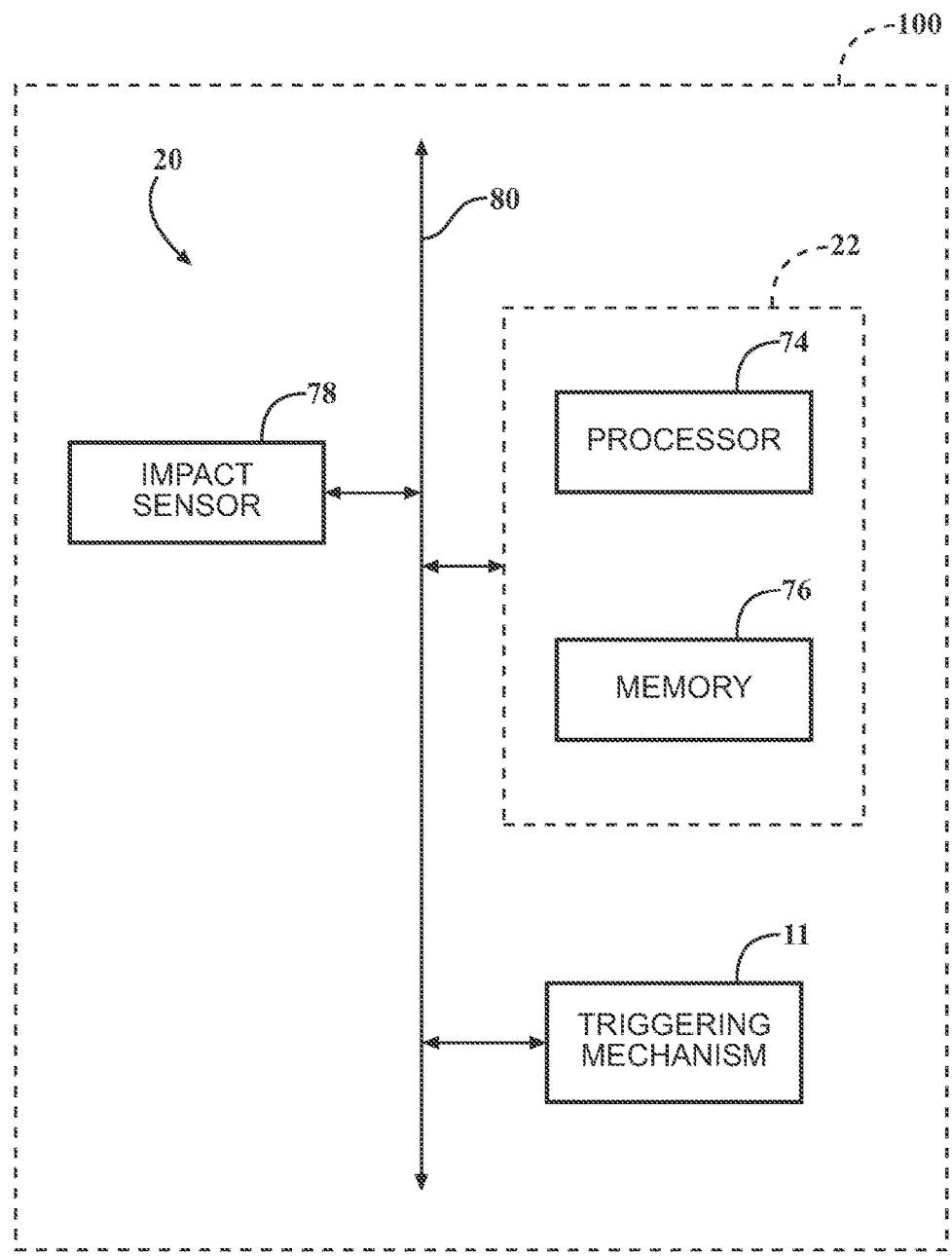
FIG. 8 is a block diagram of an impact sub-system for the passenger protection system.

The passenger protection system 100 may include the impact sensing sub-system 20, as stated above and illustrated in FIG. 8. The controller 22 of the impact sensing sub-system 20 generally includes a processor 24 and the memory 26. The memory 26 stores instructions executable by the processor 24 to identify an oblique impact, e.g., in a known manner. The controller 22 is generally further programmed to, upon identifying the oblique impact, cause triggering of the triggering mechanism 11, moving the passenger protection system 100 from the undeployed state to the deployed state.

An impact sensor 78 such as is known is typically in communication with the controller 72 to communicate data to the controller 22. The impact sensor 78 may be of any suitable type such as is known, e.g., one or more accelerometers, radar, lidar, and/or a vision system. The vision system may include one or more cameras, CCD image sensors, and/or CMOS image sensors, etc. Based on data communicated by the impact sensor 78, the controller 22 may cause triggering the triggering mechanism 11.

Communications between the controller 22, the impact sensor 78, the triggering mechanism 11, and or other components in the vehicle, may be connected to a communication bus 30, such as a controller, area network (CAN) bus, of the vehicle. The controller 22 may use information from the communication bus 30 to control the triggering of the triggering mechanism 11. The triggering mechanism 11 may be connected to the controller 22 or may be connected to the communication bus 30, as shown in FIG. 8.

What is claimed is:

1. A side curtain airbag, comprising:
   a rear chamber,
   a front chamber;
   a secondary chamber affixed to said front chamber;
   a baffle vent between the front chamber and the secondary chamber; and
   tear stitching configured to tear at selected inflation pressure, and permanent stitching, each stitching connecting the secondary chamber to an inboard panel of the front chamber on opposing sides of the baffle vent such that, upon tearing of the tear stitching, the secondary chamber occupies a gap between a driver airbag and the side curtain airbag.

2. The airbag of claim 1, wherein the secondary chamber is wedge-shaped.

3. The airbag of claim 1, wherein the forward chamber includes at least one squelch pad.

4. The airbag of claim 1, wherein the rear chamber includes at least one squelch pad.

5. The airbag of claim 1, wherein a tensile strength of the at least one tear stitch is selected to optimize the curtain airbag deployment.

6. The airbag of claim 1, wherein a stitching pattern of the tear stitching and a folding pattern of the undeployed secondary chamber are chosen to optimize deployment of secondary chamber.

7. The airbag of claim 1, wherein the shape of the secondary chamber is one of rectangular, oval, pear-shaped, hourglass-shaped or bullet-shaped.

8. The airbag of claim 1, further comprising a triggering mechanism arranged to trigger deployment of the side curtain airbag and the driver airbag.

9. The airbag of claim 8, further comprising a controller that includes a processor and a memory, the memory storing instructions executable by the processor to identify an oblique impact, and, upon identifying the oblique impact, to cause the triggering of the triggering mechanism.

10. The airbag of claim 1, wherein the tear stitching is between the permanent stitching and the baffle vent.

11. A method of deploying a vehicle side airbag that includes a front chamber, a rear chamber, and a secondary chamber affixed to the front chamber, in an oblique crash, the method comprising:
   receiving data from at least one impact sensor indicating an oblique impact;
   determining a severity of the oblique impact; and
   if the severity exceeds a predetermined threshold, sending a first instruction to a triggering mechanism to cause the front chamber, the rear chamber, and the secondary chamber to inflate, but if the severity does not exceed the predetermined threshold, sending a second instruction to the triggering mechanism to cause only the front chamber and the rear chamber to inflate.

12. The method of claim 11, wherein said receiving data from at least one impact sensor comprises receiving data from at least one selected from the group consisting of:
   an accelerometer; a radar device, a lidar device and a vision system.

13. The method of claim 11, wherein said receiving data from at least one impact sensor comprises receiving data from the at least one impact sensor is received via a controller area network (CAN) bus.

14. The method of claim 11, wherein a tensile strength of at least one tear stitch connecting the secondary chamber to the front chamber is selected to optimize the curtain airbag deployment.

15. The method of claim 11, wherein a stitching pattern of tear stitching connecting the secondary chamber to the front chamber and a folding pattern of the secondary chamber when undeployed are chosen to optimize deployment of secondary chamber.

16. A controller comprising a processor and a memory, the memory storing instructions executable by the processor, including instructions to:

identify the occurrence of an oblique impact from data received from at least one impact sensor;

determine whether the data indicates that a severity of the oblique impact exceeds a predetermined threshold; and if the severity exceeds the predetermined threshold, send a first instruction to a triggering mechanism to cause a front chamber, a rear chamber, and a secondary chamber of a side airbag to inflate, but if the severity does not exceed the predetermined threshold, send a second instruction to the triggering mechanism to cause only the front chamber and the rear chamber to inflate.

17. The system of claim 16 in which the at least one impact sensor is one of an accelerometer, a radar device, a lidar device and a vision system.

18. The system of claim 16, wherein the data from the at least one impact sensor is received via a controller area network (CAN) bus.

19. The system of claim 16, wherein a tensile strength of at least one tear stitch connecting the secondary chamber to the front chamber is selected to optimize the curtain airbag deployment.

20. The system of claim 16, wherein a stitching pattern of tear stitching connecting the secondary chamber to the front chamber and a folding pattern of the secondary chamber when undeployed are chosen to optimize deployment of secondary chamber.

* * * * *